Nov. 24, 1970 J. A. GAYLORD 3,541,651
SHAFT LOCK FOR CANOPY RELEASE
Filed Dec. 19, 1968

INVENTOR.
John A. Gaylord
BY
*George B. White*
Attorney

United States Patent Office 3,541,651
Patented Nov. 24, 1970

3,541,651
SHAFT LOCK FOR CANOPY RELEASE
John A. Gaylord, San Rafael, Calif., assignor to H. Koch & Sons, Inc., a division of Global Systems, a Gulf + Western Company, Marte Madera, Calif.
Filed Dec. 19, 1968, Ser. No. 785,242
Int. Cl. A44b 11/25
U.S. Cl. 24—230      7 Claims

ABSTRACT OF THE DISCLOSURE

In a canopy release of the type shown in U.S. Pat. No. 3,183,568 further locking means are provided for safety by a shaft lock. The rocking shaft in that type of canopy release is cut away to permit the insertion of the prongs of the male member into the pockets of the female member and the shaft is then turned for engagement with the prongs to hold them in position. The shaft locking means include a locking arm on the safety flap which latter holds down the handle yoke on the shaft. The hub of the safety flap is cut away and it forms a journal for the head of a locking arm, which latter extends into the cut away portion of the pocket into which the shaft is turned in the unlocked position. The shaft has a notch in its periphery which in the locking position of the shaft is positioned opposite the locking arm. A spring on the body of the lock is pressed by the handle yoke against the locking arm to move and press the free end of the locking arm into the notch and thereby positively prevent the turning of the shaft.

BACKGROUND OF THE INVENTION

On the type of canopy release shown in the above mentioned patent the locking of the rocking shaft which holds the prongs of the male connector member against release from the female connector member, renders the device safe against accidental release, for instance, in the event of excessive pull on the male connecting member. For this purpose, when the safety flap is turned over the handle yoke of the rocking shaft, it also turns a locking arm into engagement with the shaft in such manner as to positively prevent the turning of the shaft, and thus provide additional safety for aircraft personnel.

DETAILED DESCRIPTION

Figure 1:
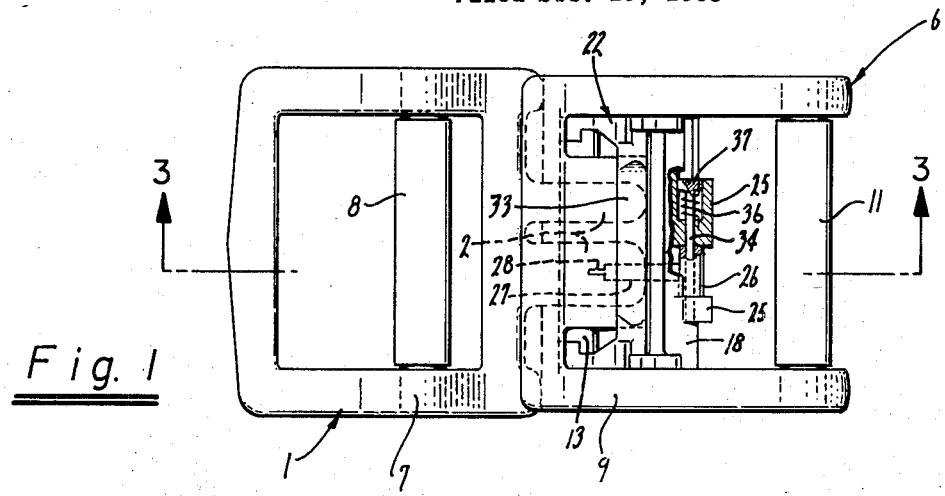
FIG. 1 is a plan view of the canopy release with the shaft lock.

The general structure of the canopy release in the illustrative embodiment of the invention shown in the drawings is similar to that shown and described in said U.S. Pat. No. 3,183,568. A male connecting member 1 has prongs thereon to be inserted in pockets 3 in the body 9 of the female connector member 6. The body 7 of the male member 1 has the usual anchor roller 8 on which one end of the strap or web is secured in the usual manner.

Figure 4:
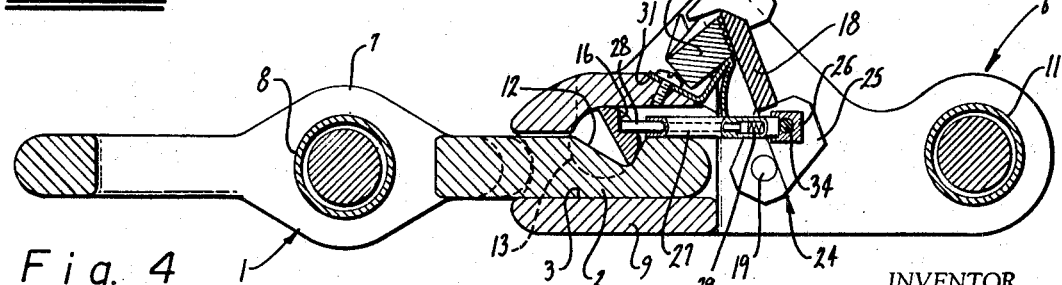
FIG. 4 is a cross-sectional view with the canopy release locked.

The body 9 of the female member 6 also has an anchor roller 11 for suitably anchoring the other end of the web. The web ends are to be connected by inserting locking prongs 2 of the male member 1 into the pockets 3 of the female member 6 as shown in FIG. 4.

The prongs 2 in this illustration are of different width to fit into correspondingly different size pockets 3 so that the male and female members can be interlocked only in one predetermined position in which recesses 12 in the prongs 2 are in registry with a locking shaft 13 journalled in the female body 9 so as to intersect the pockets 3.

Figure 3:
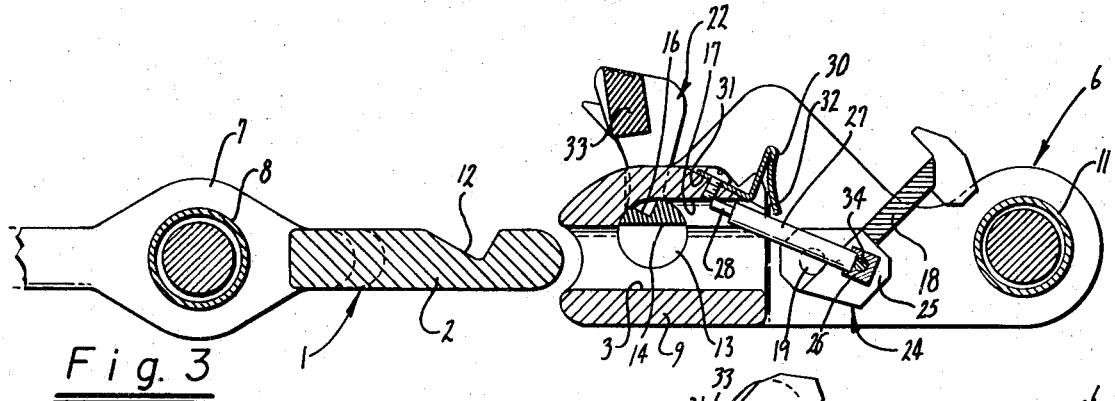
FIG. 3 is a sectional view taken substantially on lines 3—3 of FIG. 1 with the canopy release in released position.

The portions of the shaft 13 which intersect the pockets 3 are partly cut away so as to provide unobstructed passages for the insertion of the prongs 2 as shown in FIG. 3. On the side of the shaft 13, opposite the cutaway portion 14 in one of the pockets 3 is a locking notch 16 which in the releasing position of the shaft 13 is concealed in a longitudinal recess 17 along one side of the pocket 3 in which the locking notch 16 is positioned.

Figure 2:
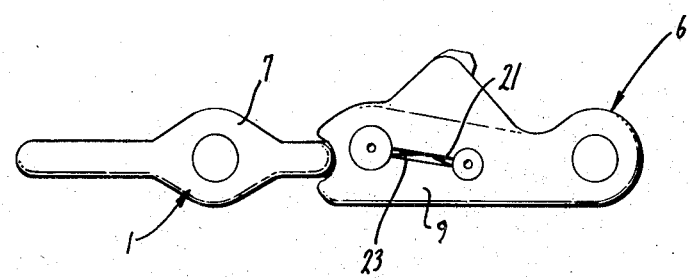
FIG. 2 is a side view of the canopy release.

The recess 17 is open toward a safety flap 18 which latter is on a pivot 19, in this illustration, between the anchor roller 11 and the pockets 3. Suitable springs 21 indicated at FIG. 2 normally urge the safety flap 18 toward and over the outer end of a handle yoke 22 which is suitably connected to the ends of the shaft 13 as described in the aforementioned patent. Suitable springs 23 urge the shaft 13 and the handle yoke 22 from the open position of FIG. 3 into the locking position in FIG. 4 in which latter position the shaft 13 projects into the recesses 12 of the prongs 2 and exposes the locking notch 16 in the recess 17.

The hub 24 of the safety flap 18 has a pair of spaced lugs 25, in which is journalled the cross head 26 of the locking arm 27. A finger 28 on the end of the locking arm 27 fits against the radial wall of the locking notch 16 as shown in FIG. 4 whenever the safety flap 18 is in the locking position overlapping the handle yoke 22. The locking arm 27 is tubular and the finger 28 is slidable therein and a coil spring 29 in the locking arm 27 urges the finger 28 against said wall of said notch 16.

A retaining leaf spring 30 has its base 31 suitably secured to an inclined face of the female body 9 adjacent the pocket 3 into which the locking arm 27 projects. The head of the spring is generally V-shaped with its free end 32 in contact with the locking arm 27, and also in registry with the cross member 33 of the handle yoke 22, so that the cross member 33 in its locking position engages the spring head 27 and presses the free end 32 of the leaf spring against the locking arm 27 as shown in FIG. 4, thereby positively holding the locking arm 27 and the finger 28 against the radial face of the locking notch 16.

The spaced lugs 25 are eccentric relatively to the axis of the journal of the hub 24 of the safety flap 18. A journal pin 34 is journalled in the lugs 25. The cross head 26 of the locking arm 27 is suitably fixed to the journal pin 34. In one of the lugs 25 is a torque spring 36 anchored at one end to an adjusting screw 37 screwed into the end of this lug, and anchored at its other end to the pin 34 so as to bias the locking arm away from the adjacent locking notch 16 of the prong 2. The eccentricity of the lugs 25 is such that when the safety flap 18 is lifted about its journal, the cross head 26 is pulled on an arc away from the recess 17 so that the locking arm 27 is urged into the recess 17 and out of the locking notch 16 thereby permitting the turning of the cross shaft 13.

I claim:
1. In a canopy release,
 (a) a female strap connector frame,
 (b) a male strap connector frame,
 (c) keeper pockets in the female frame,
 (d) connector prongs extended from the male frame and fitting into said keeper pockets,
 (e) a rocking shaft journalled in said female connector frame and intersecting said keeper pockets,

(f) portions of said shaft registering with said keeper pockets being recessed to permit insertion and removal of said prongs, (g) portions of said prongs registering with said pockets being recessed to be engaged by said shaft when said shaft is turned to move the recessed portions out of said pockets and the unrecessed portions of the shaft into said pockets for interlocking with the recessed portions of said prongs, (h) a handle yoke connected to said shaft for rocking said shaft, (i) a flap pivoted on said female connector frame engageable with said handle yoke to hold said handle yoke in an initial position interlocking said shaft with said prongs, (j) the improvement of a shaft locking device comprising, (k) a locking arm extended from said flap at least into one of said pockets, (l) means to journal said locking arm on said flap, (m) said rocking shaft having a locking notch in registry with said locking arm in the interlocking position of said shaft, (n) said journal means for the locking arm being eccentric relatively to the pivot of the flap to pull said locking arm out of said notch when said flap is raised from its yoke holding position.

2. The improvement defined in claim 1, and (o) a resiliently yieldable abutting element between said flap and said locking arm to urge said locking arm into said notch.

3. The improvement defined in claim 1, and (o) a leaf spring mounted on said female connector frame, (p) a head on said leaf spring being positioned between said flap and said locking arm to urge said locking arm into said notch.

4. The improvement defined in claim 2, and (p) resiliently yieldable means in said eccentric journal means to bias said locking arm away from said notch when said flap is raised.

5. The improvement defined in claim 2, and said journal means including, (p) a cross head on said locking arm, (q) journal elements extended from said cross head and journalled on said flap, (r) and a spring in said journal to bias said locking arm away from said notch when said flap is raised.

6. The improvement defined in claim 3, and (q) said journal means including spaced lugs on said flap providing journals eccentric relative to the pivot of the flap, (r) a cross head on said locking arm between said lugs, (s) journal extensions on said cross head journalled in said eccentric journals, (t) a torque spring anchored in at least one of said eccentric journals and connected to the adjacent journal extension for biasing said cross head and said locking arm away from said notch when said flap is raised.

7. The invention defined in claim 6, and (u) the pocket adjacent said locking arm having a recess on the side thereof adjacent said locking arm to accommodate said locking arm in the out of the way position.

References Cited

UNITED STATES PATENTS 3,183,568  5/1965  Gaylord.
3,330,014  7/1967  Gaylord.

BERNARD A. GELAK, Primary Examiner